(12) United States Patent
Transseau

(10) Patent No.: US 8,145,496 B2
(45) Date of Patent: Mar. 27, 2012

(54) TIME VARYING PROCESSING OF REPEATED DIGITAL AUDIO SAMPLES IN ACCORDANCE WITH A USER DEFINED EFFECT

(76) Inventor: Brian Transeau, Rockville, MD (US)

( * ) Notice: Subject to any disclaimer, the term of this patent is extended or adjusted under 35 U.S.C. 154(b) by 1247 days.

(21) Appl. No.: 11/807,214

(22) Filed: May 25, 2007

(65) Prior Publication Data

US 2009/0281793 A1  Nov. 12, 2009

Related U.S. Application Data

(60) Provisional application No. 60/803,210, filed on May 25, 2006.

(51) Int. Cl.
*G10L 21/00* (2006.01)
(52) U.S. Cl. ...................................................... 704/278
(58) Field of Classification Search .................. 704/200, 704/201, 270, 278; 84/609, 611
See application file for complete search history.

(56) References Cited

U.S. PATENT DOCUMENTS

| | | | | |
|---|---|---|---|---|
| 5,826,064 A * | 10/1998 | Loring et al. | ................... | 703/24 |
| 6,096,960 A * | 8/2000 | Scott | ............................. | 84/603 |
| 6,121,532 A * | 9/2000 | Kay | ................................ | 84/611 |
| 6,326,538 B1 * | 12/2001 | Kay | ................................ | 84/635 |
| 6,639,141 B2 * | 10/2003 | Kay | ................................ | 84/609 |
| 7,119,267 B2 * | 10/2006 | Hirade et al. | .................. | 84/602 |
| 7,169,996 B2 * | 1/2007 | Georges et al. | ................. | 84/609 |
| 7,342,166 B2 * | 3/2008 | Kay | ................................ | 84/609 |
| 2004/0099125 A1 * | 5/2004 | Kay | ................................ | 84/609 |
| 2005/0052981 A1 * | 3/2005 | Shim et al. | ................. | 369/59.26 |

\* cited by examiner

*Primary Examiner* — Angela A Armstrong
(74) *Attorney, Agent, or Firm* — Berliner & Associates

(57) ABSTRACT

A programmed "Stutter Edit" creates, stores and triggers combinations of effects to be used on a repeated short sample ("slice") of recorded audio. The combination of effects ("gesture") act on the sample over a specified duration ("gesture length"), with the change in parameters for each effect over the gesture length being dictated by user-defined curves. Such a system affords wide manipulation of audio recorded on-the-fly, perfectly suited for live performance. These effects preferably include not only stuttering but also imposing an amplitude envelope on the slice being triggered, sample rate and bit rate manipulation, panning (interpolation between pre-defined spatial positions), high- and low-pass filters and compression. Destructive edits, such as reversing, pitch shifting, and fading may also alter the way the Stutter Edit is heard. More advanced techniques, include using filters, FX processors, and other plug-ins, can increase the detail and uniqueness of a particular Stutter Edit effect.

10 Claims, 3 Drawing Sheets

TIME VARYING PROCESSING OF REPEATED DIGITAL AUDIO SAMPLES IN ACCORDANCE WITH A USER DEFINED EFFECT

CROSS REFERENCE TO RELATED APPLICATIONS

This application claims priority from provisional application 60/803,210 entitled "Sound Recording Technique", which is hereby incorporated by reference in its entirety.

BACKGROUND OF THE INVENTION

1. Field of the Invention

The present invention relates to processing of digital audio and, more particularly, to a method and apparatus for manipulating the digital audio with various user defined effects.

2. Description of the Related Art

"Stutter Edit" encompasses a technique which is a unique way of manipulating digital audio in such a manner as to create an effect that cannot be done with contemporary software or plug-ins. There is currently no software available to create a so-called "Stutter Edit" sound using digital audio. "Stutter Edit" refers to a technique pioneered by the inventor which typically involves the rapid retriggering of a portion of the audio input and affecting the resulting sound sample with a variety of audio effects, all synchronized to a master tempo, and is conventionally performed by editing the sample by hand with the use of multiple programs. The resultant "Stutter Edit" sound may then be combined with the original and/or other sound sources. From this point there are various additional steps in molding the desired effect. After a basic "Stutter" effect is created (typically a continual retriggering of a specific, smaller slice of digitized audio from an associated buffer), it can be processed in many ways. With the manual techniques pioneered by the inventor, destructive edits, such as reversing, pitch shifting, and fading to alter the way the stutter is heard, are sometimes used. More advanced techniques, include using filters, FX processors, and other plug-ins, can increase the detail and uniqueness of a particular stutter effect.

There are programs and plug-ins that perform and produce relatively simple "Stutter" effects which some have characterized as a "Stutter Edit", but which lack the mathematical and aesthetic qualities of the sounds previously created by the inventor's manual Stutter Edit techniques. One such known process is the "SupaTrigga" program by Smart Electronix. This program captures slices of audio and rearranges them in a random and generally unpredictable way. The "Buffer Override" program by DestroyFX has the ability to repeat small sections of audio at rates such that they sound as pitches, but offers no rhythmic repetition, slice selection, or built in effects.

Other techniques involve methods that are restricting at best. Retriggering sounds via MIDI (Musical Instrument Digital Interface) is one potential solution to creating a simple "Stutter Edit" type sound. However, MIDI samplers are usually designed for studio use and do not provide the option for tempo synchronized capture of audio. MIDi has many problems and, due to bandwidth limitations, MIDI is inaccurate and unreliable. Also, the retriggering of a sound is only a beginning step in the creation of a Stutter Edit sound effect. The use of software samplers triggering audio from hard drives has also been tried. Besides the problems inherent in retriggering sounds via MIDI and digital audio from hard drives, there is more to the process in creating a desirable Stutter Edit effect.

In summary, the known prior art software fails to provide a mechanism for conveniently replicating the structure, sound, and specific effects of the inventor's manual Stutter Edit. In particular, none of the currently available plug-ins provides for the real time processing of audio sufficient to produce a complex "stutter-edit" type sound including the ability to prepare, beforehand, a time varying combination of effects, and to then apply these effects in real time to a sound sample subsequently captured during a live performance.

SUMMARY OF THE INVENTION

As envisaged by the inventor, a programmed "Stutter Edit" is a novel system for creating, storing and triggering combinations of effects to be used on a repeated short sample ("slice") of recorded audio. The combination of effects ("gesture") act on the sample over a specified duration ("gesture length"), with the change in parameters for each effect over the gesture length being dictated by user-defined curves. Such a system affords wide manipulation of audio recorded on-the-fly, perfectly suited for live performance.

These effects preferably include not only stuttering but also imposing an amplitude envelope on the slice being triggered, sample rate and bit rate manipulation, panning (interpolation between pre-defined spatial positions), high- and low-pass filters and compression. Destructive edits, such as reversing, pitch shifting, and fading may also alter the way the Stutter Edit is heard. More advanced techniques, include using filters, FX processors, and other plug-ins, can increase the detail and uniqueness of a particular Stutter Edit effect.

Another optional feature of the present invention is the ability to manipulate the levels and effect parameters of a second set of outputs which feed a companion plug-in "Catch". For example, one audio stream passes through a reverb and a flanger, and another through a bandpass filter and a tempo-sync'd delay line. Any number of Catch plug-ins can be initiated on other channels and each can receive and output one of these streams.

In some embodiments, the rate at which slices are retriggered can be selected by alternative methods which overlap somewhat. The first is by selecting note lengths, such as quarter notes or sixteenth notes. The second is by choosing note names, whereby a plug-in can retrigger the slice so fast that it becomes an audible pitch corresponding to that note name. A matrix of note lengths and note names would then let the user select which specific values of each will be available for use on the stutter interpolation curve and pre-defined musical scales of note names can be turned off or on at once by the use of a drop-down menu.

Preferably, the rate of retriggering can be changed over the course of the gesture length by the stutter interpolation curve. This either creates a smooth transition form the start value to end value, or can step at rhythmic intervals. When stepping, the plug-in will always choose stutter values selected by the user via the selection matrix.

The specific slice of the buffer to be used for stuttering is preferably selected with the mouse via a graphical representation of the buffer to select an audio signal of desired duration and store it in a buffer. Using that same graphic user interface, the user could also select a start and stop time for the entire gesture and choose the nature of each included effect.

Alternatively the specific slice can be chosen by other methods. For example, a "Follow Mode" changes the slice along with the playback of the host sequencer and a "Random Mode" randomly selects a new slice after completing playback of the old slice.

The novel features which are characteristic of the invention, both as to structure and method of operation thereof, together with further objects and advantages thereof, will be understood from the following description, considered in connection with the accompanying drawing, in which the preferred embodiment of the invention is illustrated by way of example. It is to be expressly understood, however, that the drawing is for the purpose of illustration and description only, and is not intended as a definition of the limits of the invention.

DESCRIPTION OF THE PREFERRED EMBODIMENT

Figure 1:
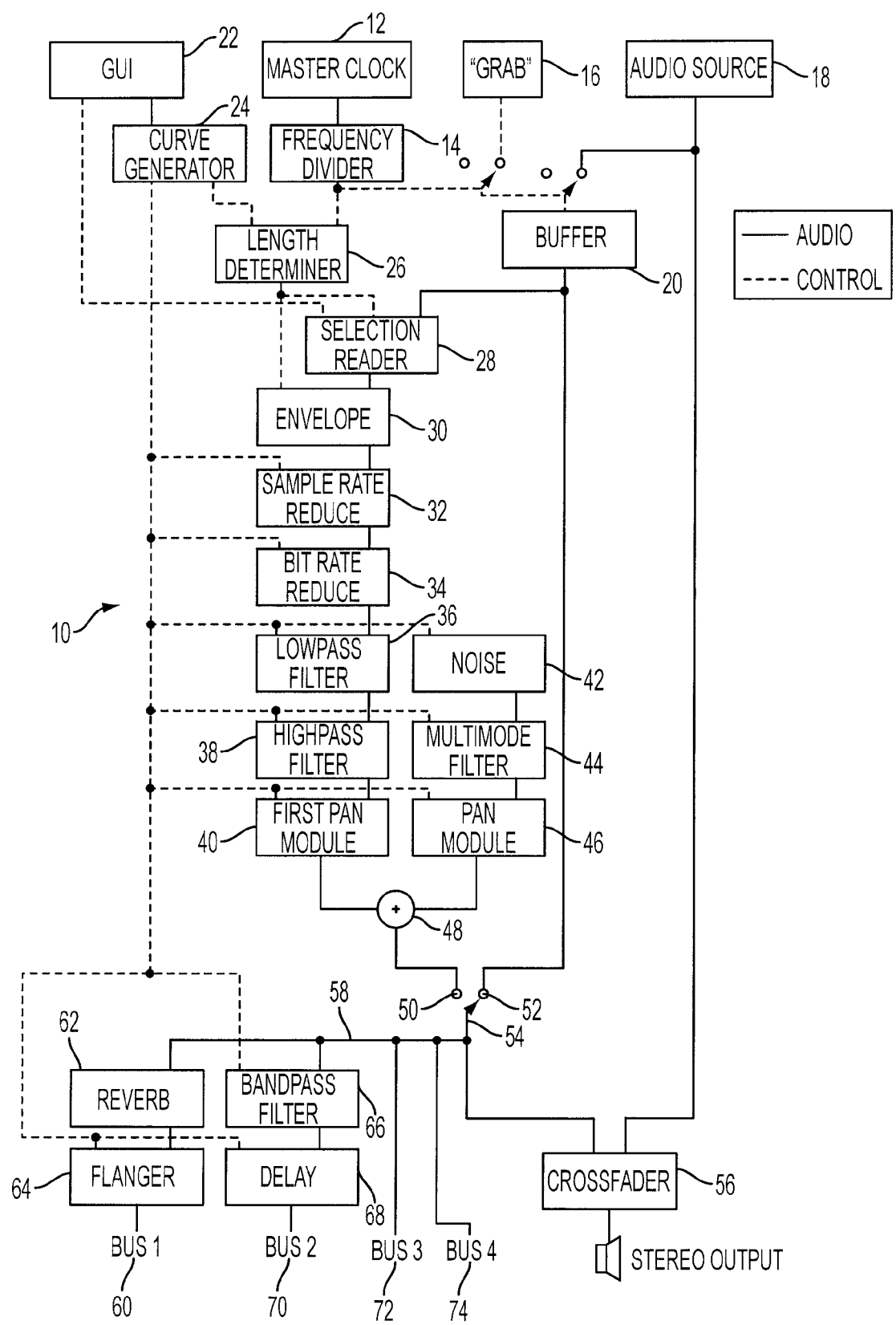
FIG. 1 is a flow chart showing the components utilized in creating the unique sound effect of the present invention.

Turning to flow chart of FIG. 1, it will be seen that the Stutter Edit program works synchronously to produce the effect desired. Those connections which transmit audio signals are indicated by solid lines while connections transmitting control signals are shown as interrupted or dashed lines.

At the heart of the program system 10 is a master clock 12 which pulses and locks internally to a host environment sequencer (not shown). Every event generated by the system 10 can be synchronized to the master clock 12. The master clock 12 holds the tempo synchronization information for the entire system 10.

In the preferred embodiment, a frequency divider 14 is provided to convert the clock signals into timing intervals that can be used to generate desired effects. A "grab" switch 16 under control of signals from the frequency divider 14 acts to gate audio signals from an audio source 18 and to synchronize the storage of an audio segment of a selected musical interval in a buffer 20.

A Graphic User Interface ("GUI") 22 allows for manual selection of values for the components dependant upon user input. The user can edit breakpoints and select particular curves which are created in a curve generator 24. A length determiner circuit 26 receives inputs from the curve generator 24 and the frequency divider 14 to select the duration of a created effect.

A selection reader 28 under control of the length determiner 26 obtains an audio sample from the buffer 20 of preselected duration. This sample is retriggered at a rate controlled by the length determiner 26. An amplitude envelope 30 receives an audio input from the selection reader 28 and parameter controlling signals from the length determiner 26.

The envelope 30 implements the "buffer width" effect previously mentioned. When this effect is in line, it creates an amplitude envelope on each retriggered portion of audio, giving the output a "staccato" sound. The duration of the envelope changes over time according to a curve the user defines in the GUI.

The audio signal is passed to a Sample Rate Reduce element 32 in which the input is resampled at a rate less than would be normally considered desirable for high quality audio. The result is a grainy "lo fi" sound which is often found in some genres of electronic music.

A Bit Rate Reduce element 34 creates yet a different effect. The amplitude of the signal is quantized to a smaller set of values than would be normally used for high quality audio. The result is a loud, distorted version of the input which can be pleasing because of the odd harmonics the effect introduces.

The audio signal next is applied to a low Pass Filter element 36. This digital filter simply attenuates high frequencies and has the ability to add resonance at the cutoff frequency. Sweeping the cutoff over time according to a user defined curve in the GUI allows for a classic "filter sweep" sound which sounds like a drastic change in tone.

The audio signal is next applied to a High Pass Filter 38 which behaves similarly to the low Pass Filter 36 except that frequencies below the cutoff frequency are attenuated. This, too, can be a desirable effect in some instances.

The audio path goes next to a first Pan Module 40 which, when engaged, adds panning effects to the stereo input signal according to certain preset "Pan Patterns." The pattern is stepped through at the same rate at which the audio is being retriggered. The module can morph from one pattern to another over time (according to a user defined curve), and in this case the pattern at any given time is the weighted average of the start pattern and the end pattern.

For added effects, a Noise generator 42 independently generates "white noise". The amplitude at which it outputs is controlled by a predefined curve, once it is triggered by the user. This "white noise" is applied to a Multimode Filter element 44 which is just like the low pass or high pass filter elements 36, 38 previously discussed except that it has the ability to be either one of those, or both, in the case of it being switched by the user to the appropriate "Band pass" mode.

A second Pan Module 46 is a little different from the first Pan Module 40 in that it simply sweeps the noise back and forth between the left and right channels. In this case it's the rate at which it's sweeping that can be controlled by a user-defined curve.

The outputs of the Pan Modules 40, 46 are combined in an adding circuit 48 and the output is presented to one terminal 50 of a 2 position switch, the other terminal 52 of which receives the output of the Buffer 20 without modification. The switch output 54 which alternates between the terminals 50, 52 transmits its signal to several destinations.

A first destination is a crossfader 54 which serves as a switch between the Memory Buffer 20 (with the switch output 54 selecting either the audio stored in the buffer 20 or the processed signal from signal conditioners and modifiers) and the audio source 18. It allows the user the option to output Memory Buffer 20 playback or the source audio. By switching to the audio source 18, the user, in essence, bypasses the system 10.

The same signal that is applied to the cross fader is also transmitted to a bus channel 58 which connects to (in the present example) Bus1 60 which further modifies the output signal through the use of included reverb circuit 62 and flanger 64.

Bus2 66 receives its input from the bus channel 58, modified by an additional band pass filter 66 and a delay circuit 68. However, Bus3 70 and Bus4 72 receive their signals from switch output 54 without further modification.

Addition processes will be implemented to include hard processing and sequencing of audio segments. When not synchronized to the host sequencer 40 by the master clock 12, the system 10 can implement offline processing of playback audio segments. From this point many effects and processes can be applied for use in real-time playback.

The buttons Stutter 86, Reverse 88, Reverb 90, Delay 92, Bus1 94A, and Bus2 94B allow the user to initiate certain effects. The primary one is, of course, Stutter 86. Actuating the Stutter button 86 causes the triggering of the current configuration of effects. The other buttons allow implementation of other, simpler, auxiliary effects, not central to a Stutter Edit implementation. The Reverse button 88 serves as the trigger for the separate "NOISE" signal chain, described in connection with the flow chart of FIG. 1, above. The Reverb button 90 opens a gate to the Reverb 62 and Flanger 64 signal path that feeds Bus1 60, visible in the flowchart of FIG. 1.

The Delay button 90 opens a gate to the Bandpass Filter 66 and Delay 68 signal chain that feeds Bus2 70, visible in the flow chart of FIG. 1. The Bus1 button 94A feeds a copy of all audio output to Bus3 72 in the flowchart. This is counterintuitive, of course inasmuch as internally the Buses are numbered 1-4. However, the user will consider Bus1 60 as the Reverb Bus, Bus2 70 as the Delay Bus, Bus3 72 as Bus1, and Bus4 74 as Bus2. The Bus2 button 94B feeds a copy of all audio output to Bus4 70 in the flowchart of FIG. 1.

On the right side of the screen 80 there are additional control icons shown as buttons with column legends "D" and "T", which represent a Selection Matrix 96. This is not where one selects the start and end value of the Stutter. Rather, this is where one chooses exactly what note values are available as valid "start" and "end" values. The program also looks at this matrix when the user chooses to quantize a curve ("Step Mode") to determine which note values are valid from which to pick when quantizing. Below these note value buttons 96 there is another group of note selection buttons 98 which resemble a small keyboard. Along with rhythmic lengths, note "names" (A, Bb, C#, etc) can also be made to be the Start or End values for the Stutter length. This small "keyboard" allows one to turn certain notes "on" or "off", thereby choosing whether they are valid choices for this purpose.

Figure 2:
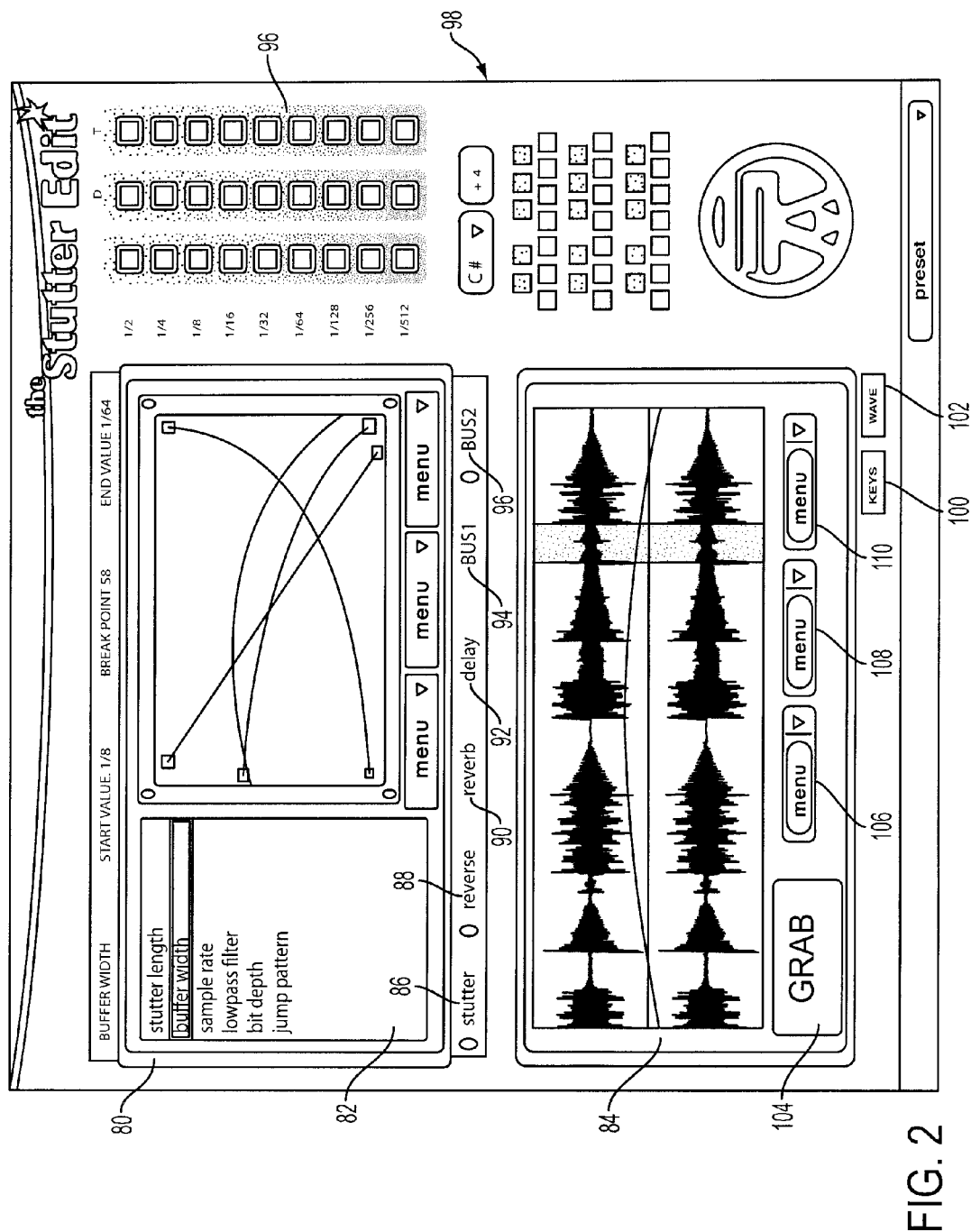
FIG. 2 is a screen shot of a Graphic User Interface (GUI) which has a keyboard input and represents particular settings.
Figure 3:
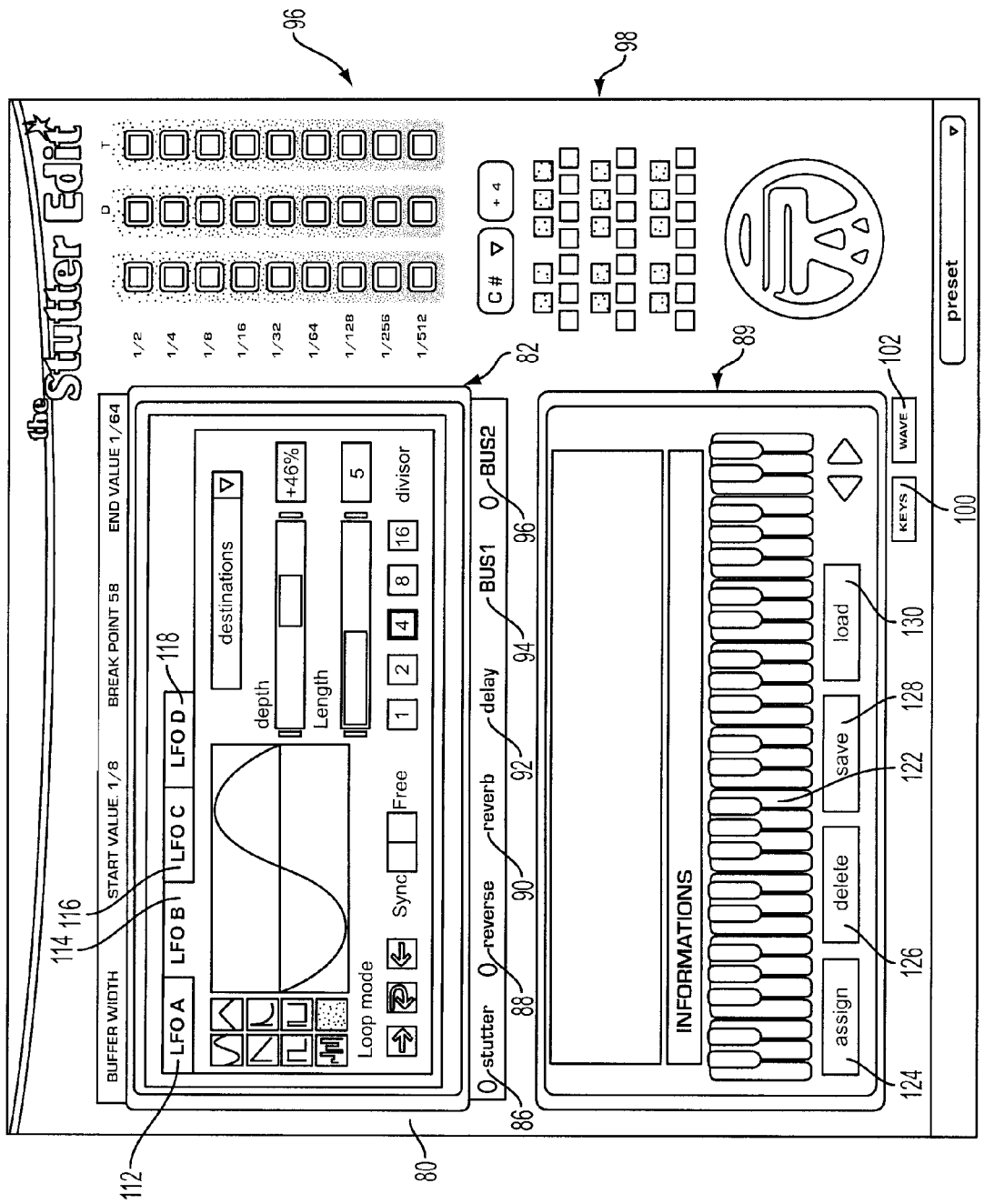
FIG. 3 is a screen shot of an alternative screen of the GUI showing a wave pattern used to determine starting points.

The "Keys" button 100 and "Wave" button 102 at the bottom of the screen 84 simply select which panels are visible, for example, the screen of FIG. 2 or the screen of FIG. 3. The upper panel 82 can be either the Envelope panel (FIG. 2) or the LFO panel, (FIG. 3) depending on these toggles, just like the lower panel 84 can be either the Waveform Panel (FIG. 2) or the Keyboard Panel (FIG. 3).

With Specific reference to FIG. 2, the top panel 82 is the Envelope Editor. The left 40% of the panel allows one to select which parameter's envelope is being edited at any given time. The right 60% of the panel shows that particular envelope in the foreground, with other envelopes lightly in the background. The envelopes are edited by clicking and dragging the vertical position of any of three points on the envelope. These three points are the start value, middle value, and end value. The vertical axis represents the total range of the parameter, while the horizontal axis represents the length of time over which the entire gesture (and therefore all parameter envelopes) takes place. It is with the envelope editor that one chooses the Start Value and End Value for the stutter length, but that is just one of the many parameters available for editing by the envelope editor. The curves shown in the figure are merely examples of possible curves that can be created by clicking and dragging the three points.

The lower panel 84 is the Waveform Display. The main view in this panel is of the waveform of the stored samples in the buffer 20, captured when the user activated the GRAB button 104, visible below it. The waveform view is also a control that lets the user choose that point in the buffer which should be used as a start point, when drawing samples from the buffer for playback. The three menus 106, 108, 110 below control various aspects of the buffer. A first Menu button 106 lets the user choose how large the buffer is in units of one measure. A second Menu button 108 lets the user choose among various modes which alter the playback position over the course of the gesture in different ways. A third Menu button 110 lets the user pick the note durations (¼, ⅛, etc) to which a user selected point in the buffer is quantized.

Turning next to FIG. 3, which is the alternative screen display selected by the "wave" switch 102, the top panel 82 is the LFO Editor. This has four tabs, LFO A through LFO D 112, 114, 116, 118. Each represents a LFO (Low Frequency Oscillator). As each all are identical, it is only necessary to explain the operation of one of them. An LFO runs continuously, outputting a signal that varies over time according to one of several user-selectable wave shapes. The frequency is low, so that the length of time the LFO takes to complete one cycle might be as long as two seconds. In Sync mode, the period can be "snapped" to musical lengths, such as 1 bar. The LFO is provides an even more dynamic quality to the parameters controlling the stutter effect. Each parameter receives its instantaneous value not just from the envelopes, but from the sum of the envelopes and a user-specified percentage of the LFO signal. Each LFO can be assigned to a different parameter. That is the reason there are four of them.

The lower panel 84 is the Keyboard Editor 120. The Keyboard Editor 120 allows one to assign "gestures" to different keys 122. It is important, however, to keep a record of which gestures have been assigned to which keys 122. The buttons "Assign" 124, "Delete" 126, "Save" 128 and "Load" 130 facilitate that process.

Those skilled in the art may modify the teaching for particular applications. However, it is believed that a new and creative tool has been provided to the performing arts.

The invention claimed is:

1. A programmed system for creating, storing and triggering combinations of effects to be used on a digital audio stream, comprising:
   a host sequencer responsive to a master system clock;
   slice selecting means for selecting at least one sample from the audio stream and
   gesture defining means for defining a stutter edit gesture to be applied to said at least one sample over a specified gesture length, with each effect incorporated in said gesture having at least one respective parameter which varies over the gesture length in accordance with a respective user-defined curve,
   wherein
   said stutter edit gesture has a user determined start time and end time and includes a successive retriggerings of said one or more samples, with each retriggering having not only a respective user defined length but also a user defined amplitude envelope,
   the length and amplitude envelope of successive said retriggerings are independently varied within each said stutter edit gesture in accordance with respective user defined curves to thereby form a sequence of time varying staccato effects; and
   said stutter edit gesture is applied to the selected samples by the host sequencer under the control of said master system clock.

2. The programmed system of claim 1, wherein the slice selecting means and the gesture defining means are each responsive to a respective graphical user interface.

3. The programmed system of claim 1, wherein the slice selecting means follows said host sequencer.

4. The programmed system of claim 1, wherein the slice selecting means comprises a random mode of operation.

5. The programmed system of claim 1, wherein said combination of effects further comprises a stereo panning effect, and said master system clock synchronizes said stereo panning effect to the time varying stutter effects.

6. The programmed system of claim 5 wherein the stereo panning effect is responsive to multiple audio input channels.

7. The programmed system of claim 5 wherein the stereo panning effect is responsive to at least one audio input channel and at least one noise source.

8. A programmed system for creating, storing and triggering combinations of effects to be used on a digital audio stream, comprising:

a host sequencer responsive to a master system clock;

slice selecting means for selecting at least one sample from an audio stream and gesture defining means for defining a combination of effects to be applied to the said at least one sample over a specific gesture length, wherein said combination of effects is a "stutter edit gesture" which acts on the specific sample over the specific gesture length in response to a user specified start command, with each effect incorporated in said gesture having at least one respective parameter which varies over the gesture length in accordance with a respective user-defined curve;

said stutter edit gesture includes a stutter effect having a succession of user defined retriggering lengths each with an independently user defined amplitude envelope and is synchronized to said master system clock;

said slice selecting means and said gesture defining means each comprise a respective graphical user interface; and said combination of effects further comprises a stereo panning effect synchronized by said master system clock to the stutter effect, said stereo panning effect being responsive to multiple streams of digital audio.

9. The programmed system of claim 8, wherein the slice selecting means has an optional random mode of operation.

10. The programmed system of claim 8, wherein said stereo panning effect is responsive to at least one audio input channel and at least one noise source.

* * * * *